(12) United States Patent
Kashiwazaki et al.

(10) Patent No.: US 12,339,564 B2
(45) Date of Patent: Jun. 24, 2025

(54) WAVELENGTH CONVERSION APPARATUS

(71) Applicant: Nippon Telegraph and Telephone Corporation, Tokyo (JP)

(72) Inventors: Takahiro Kashiwazaki, Musashino (JP); Koji Embutsu, Musashino (JP); Takeshi Umeki, Musashino (JP); Osamu Tadanaga, Musashino (JP); Takushi Kazama, Musashino (JP); Asuka Inoue, Musashino (JP); Nobutatsu Koshobu, Musashino (JP); Ryoichi Kasahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 236 days.

(21) Appl. No.: 18/000,911

(22) PCT Filed: Jul. 22, 2020

(86) PCT No.: PCT/JP2020/028390
§ 371 (c)(1),
(2) Date: Dec. 6, 2022

(87) PCT Pub. No.: WO2022/018845
PCT Pub. Date: Jan. 27, 2022

(65) Prior Publication Data
US 2023/0221617 A1 Jul. 13, 2023

(51) Int. Cl.
*G02F 1/377* (2006.01)
*G02B 6/028* (2006.01)
*G02B 6/30* (2006.01)

(52) U.S. Cl.
CPC ........... *G02F 1/377* (2013.01); *G02B 6/0288* (2013.01); *G02B 6/30* (2013.01)

(58) Field of Classification Search
CPC . G02F 1/377; G02F 1/37; G02F 1/383; G02B 6/0288; G02B 6/30
See application file for complete search history.

(56) References Cited

U.S. PATENT DOCUMENTS

2015/0036210 A1 2/2015 Asobe et al.

FOREIGN PATENT DOCUMENTS

| JP | 2001-352116 A | 12/2001 |
| JP | 2014-089254 A | 5/2014 |
| WO | 2012/098911 A1 | 7/2012 |

OTHER PUBLICATIONS

T. Umeki, et al., *Phase Sensitive Degenerate Parametric Amplification Using Direct-Bonded PPLN Ridge Waveguides*, Optics Express, vol. 19, No. 7, 2011, pp. 6326-6332.

(Continued)

*Primary Examiner* — Tina Wong
*Assistant Examiner* — Mary A El-Shammaa
(74) *Attorney, Agent, or Firm* — Workman Nydegger (57) ABSTRACT

Even when excitation light having large power is used, damage at the end face of the optical fiber is suppressed, and reduction in wavelength conversion efficiency and reduction in phase sensitive amplification gain are prevented. An embodiment of the present invention relates to a wavelength conversion apparatus for performing a wavelength conversion operation by inputting a fundamental wave and a second-order harmonic into a second-order nonlinear optical medium, the wavelength conversion apparatus comprising: a second-order harmonic input optical fiber optically coupled to a waveguide of the second-order nonlinear optical medium, for inputting the second-order harmonic into the waveguide; and a second-order harmonic output optical fiber optically coupled to a waveguide, for outputting the second-order harmonic output from the waveguide, wherein (Continued)

the second-order harmonic input optical fiber and the second-order harmonic output optical fiber are polarization maintaining fibers.

6 Claims, 5 Drawing Sheets

(56) References Cited

OTHER PUBLICATIONS

T. Umeki, et al., *First Demonstration of High-Order QAM Signal Amplification in PPLN-Based Phase Sensitive Amplifier*, Optics Express, vol. 22, No. 3, 2014, pp. 2473-2482.

Fig. 1

PRIOR ART

WAVELENGTH CONVERSION APPARATUS

TECHNICAL FIELD

The present invention relates to a wavelength conversion apparatus using a second-order nonlinear optical element.

BACKGROUND ART

Wavelength conversion techniques have been utilized in various application fields such as optical signal wavelength conversion, optical processing, medical treatment, and biotechnology in optical communication. The wavelength region of the light to be subjected to wavelength conversion extends from the ultraviolet region to the visible region, the infrared region and the terahertz region, and to the wavelength region which cannot be directly output by the semiconductor laser. Further, wavelength conversion technology is also used in applications where the wavelength range used can be directly output by a semiconductor laser, but the semiconductor laser alone cannot provide sufficiently high output power. In optical communication systems, wavelength conversion technology is used, for example, in wavelength conversion operations using difference frequency generation, as described below, and in wavelength conversion apparatus that perform amplification operations using parametric effects. Focusing on the material used for wavelength conversion, lithium niobate (LiNbO3: LN), which is a second-order nonlinear material and has a large nonlinear constant, is used. Wavelength conversion apparatus having optical waveguides of a periodically poled structure using LN are widely used in commercially available light sources because of the high wavelength conversion efficiency.

In the second-order nonlinear optical effect, three mechanisms are used which input light having a wavelength $\lambda 1$ and light having a wavelength $\lambda 2$ into a second-order nonlinear medium to generate a new wavelength $\lambda 3$. First, the wavelength conversion operation that satisfies Equation (1) is called sum frequency generation.

$$1/\lambda 3=1/\lambda 1+1/\lambda 2 \quad \text{Equation (1)}$$

Second, the wavelength conversion operation that satisfies Equation (2), where $\lambda 1=\lambda 2$ and Equation (1) is transformed, is called second-order harmonic generation.

$$\lambda 3=\lambda 1/2 \quad \text{Equation (2)}$$

Third, wavelength conversion operation that satisfies Equation (3) is called to as difference frequency generation.

$$1/\lambda 3=1/\lambda 1-1/\lambda 2 \quad \text{Equation (3)}$$

A wavelength $\lambda 1$, a wavelength $\lambda 2$, and a wavelength $\lambda 3$ for generating a difference frequency according to the Equation (3) are called an excitation light, signal light, and idler light, respectively. Furthermore, an optical parametric oscillator may be configured in which a nonlinear medium is put in a resonator and only a wavelength $\lambda 1$ is input to generate a wavelength $\lambda 2$ and $\lambda 3$ satisfying the Equation 3.

In recent years, an optical amplification operation by a second-order nonlinear effect has been made possible in the field of communication by improving the wavelength conversion efficiency which is the ratio of the intensity of the wavelength-converted light to the intensity of the incident light. The phase-sensitive operation of this optical amplifier allows it to amplify the input light without degrading its signal-to-noise ratio. Phase sensitive amplifiers are expected as optical amplifiers for long-distance transmission in place of erbium doped fiber amplifiers.

Two amplifying operations are known in the phase sensitive amplifier. One is an operation using degenerate parametric amplification, in which a signal light and an excitation light of half the wavelength of the signal light are input to a second-order nonlinear medium to amplify the signal light (see, for example, NPL 1). The other is an operation using nondegenerate parametric amplification, in which the signal and idler light are amplified by inputting a pair of signal and idler light and an excitation light at a wavelength that is the sum frequency of the signal and idler light (see, for example, NPL 2). The pair of signal light and idler light is generated by the above-mentioned difference frequency generation.

When a wavelength conversion technique using a second-order nonlinear optical effect is used in the communication field, difference frequency generation and parametric amplification are mainly used among the three mechanisms based on the above-mentioned second-order nonlinear effect. In difference frequency generation and parametric amplification, the signal and idler light are in the 1.55-µm communication wavelength band, so the excitation light is 0.78-µm band. As a light source for the excitation light, it is necessary to have a wavelength of about several hundreds mW to several W. Although the required output level is lowered due to the recent improvement of the wavelength conversion efficiency, a high-power light source is still required.

Figure 1:
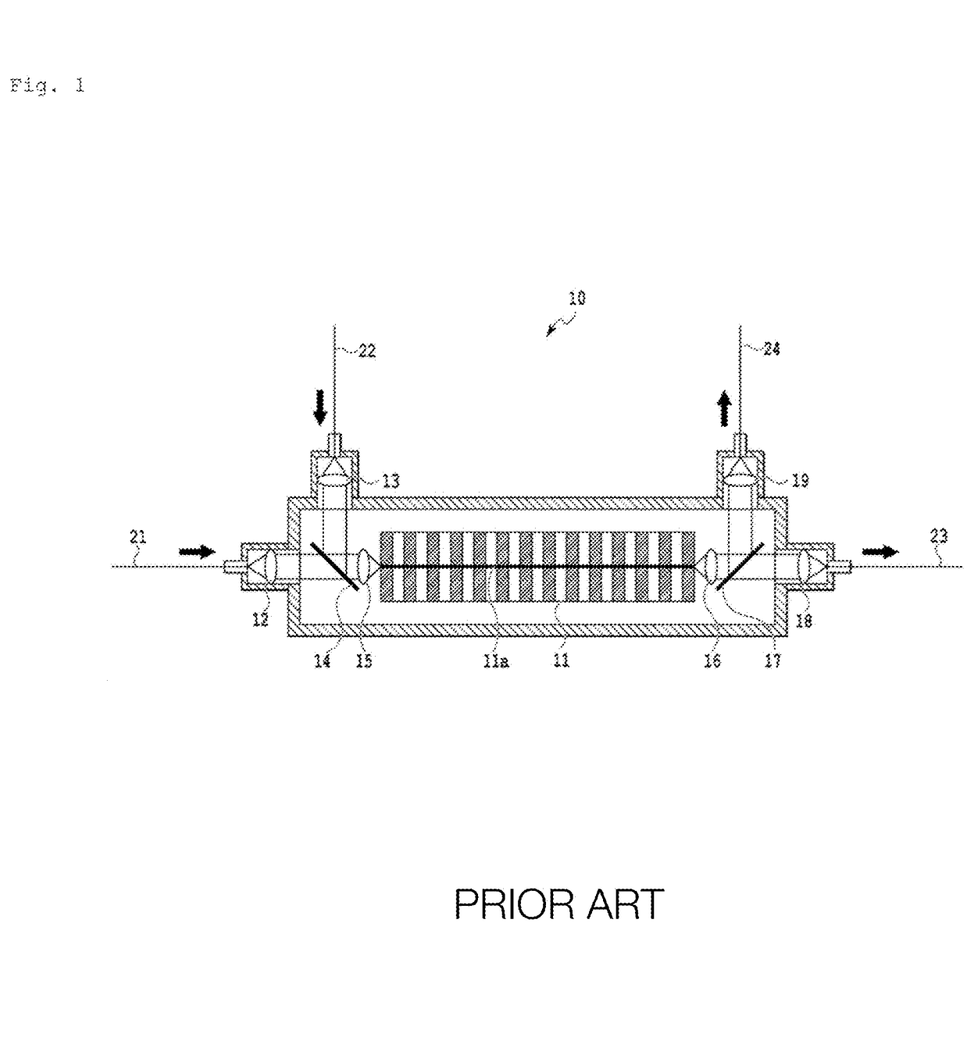
FIG. 1 illustrates a configuration of a conventional wavelength conversion apparatus.

FIG. 1 shows the structure of a conventional wavelength conversion apparatus. The wavelength conversion apparatus 10 includes a wavelength conversion element 11 having an optical waveguide 11a of a periodically poled structure, an optical system for making light incident on the wavelength conversion element 11, and an optical system for emitting light from the wavelength conversion element 11. The 1.56-µm band signal light that is input from the 1.56-µm band optical fiber 21 is optically coupled to the optical waveguide 11a of the wavelength conversion element 11 by lenses 12 and 15 through the dichroic mirror 14. In addition, the 0.78-µm band excitation light input from the 0.78-µm band optical fiber 22 is optically coupled to the optical waveguide 11a by the lenses 13, 15 through the dichroic mirror 14.

The dichroic mirror 14 transmits the 1.56-µm band light, reflects the 0.78-µm band light and combines the 1.56-µm band light and 0.78-µm band light. Lens 15 on the incident side of wavelength conversion element 11 has a common lens that is available for shared use in the 1.56-µm and 0.78-µm bands.

The 1.56-µm band idler light that is output from the output end of the optical waveguide 11a of the wavelength conversion element 11, is optically coupled to 1.56-µm band optical fiber 23, by lenses 16, 18 through the dichroic mirror 17. After undergoing wavelength conversion operation, the amplified signal light is output from the 1.56-µm band optical fiber 23 as idler light. The 0.78-µm band light output from the output end of optical waveguide 11a is reflected by dichroic mirror 17, and is optically coupled by lenses 16 and 19 to 0.78-µm band optical fiber 24. If the 0.78-µm band can be removed from the output light of optical waveguide 11a, it is not necessary to connect to a fiber. As the wavelength conversion element 11, a waveguide-type element with a periodically poled structure applied to the LN can be used.

However, in the conventional wavelength conversion apparatus, when the power of the excitation light is increased, the wavelength conversion efficiency is lowered and the phase-sensitive amplification gain is lowered. In a wavelength conversion apparatus used in a communication wavelength band, light of 1,560-nm wavelength is used as a fundamental wave and 780-nm wavelength is used as a second-order harmonic. The inventors found that when the power of the excitation light, which is the second-order harmonic, is high, the end face of the optical fiber from which the excitation light is emitted and the end face of the optical fiber into which the excitation light enters are damaged, resulting in a decrease in wavelength conversion efficiency and phase-sensitive amplification gain.

CITATION LIST

Non Patent Literature

[NPL 1] T. Umeki, O. Tadanaga, A. Takada, and M. Asobe, "Phase Sensitive Degenerate parametric amplification using direct-bonded PPLN ridge waveguides", Optics Express Vol. 19, No. 27, PP. 6326-6332, 2011
[NPL 2] T. Umeki, O. Tadanaga, M. Aobe, Y. Miyamoto, and H. Takenouchi, "First demonstration of high-order QAM signal amplification in PPLN-based phase sensitive amplifier", Optics Express Vol. 22, No. 3, PP. 2473-2482, 2014

SUMMARY OF INVENTION

An object of the present invention is to provide a wavelength conversion apparatus capable of suppressing damage at an end face of an optical fiber even when excitation light having large power is used, and preventing reduction in wavelength conversion efficiency and reduction in phase-sensitive amplification gain.

To achieve these purposes, one embodiment of the present invention is a wavelength conversion apparatus for performing a wavelength conversion operation by inputting a fundamental wave and second-order harmonics into a second-order nonlinear optical medium, and includes a second-order harmonic input optical fiber optically coupled to a waveguide of the second-order nonlinear optical medium for inputting the second-order harmonic to the waveguide and a second-order harmonic output optical fiber for outputting the second-order harmonic which is optically coupled with the waveguide and is outputted from the waveguide, and said second-order harmonic input optical fiber and said second-order harmonic output optical fiber are polarization maintaining fibers.

DESCRIPTION OF EMBODIMENTS

The following is a detailed description of embodiments of the present invention with reference to the drawings.

Figure 2:
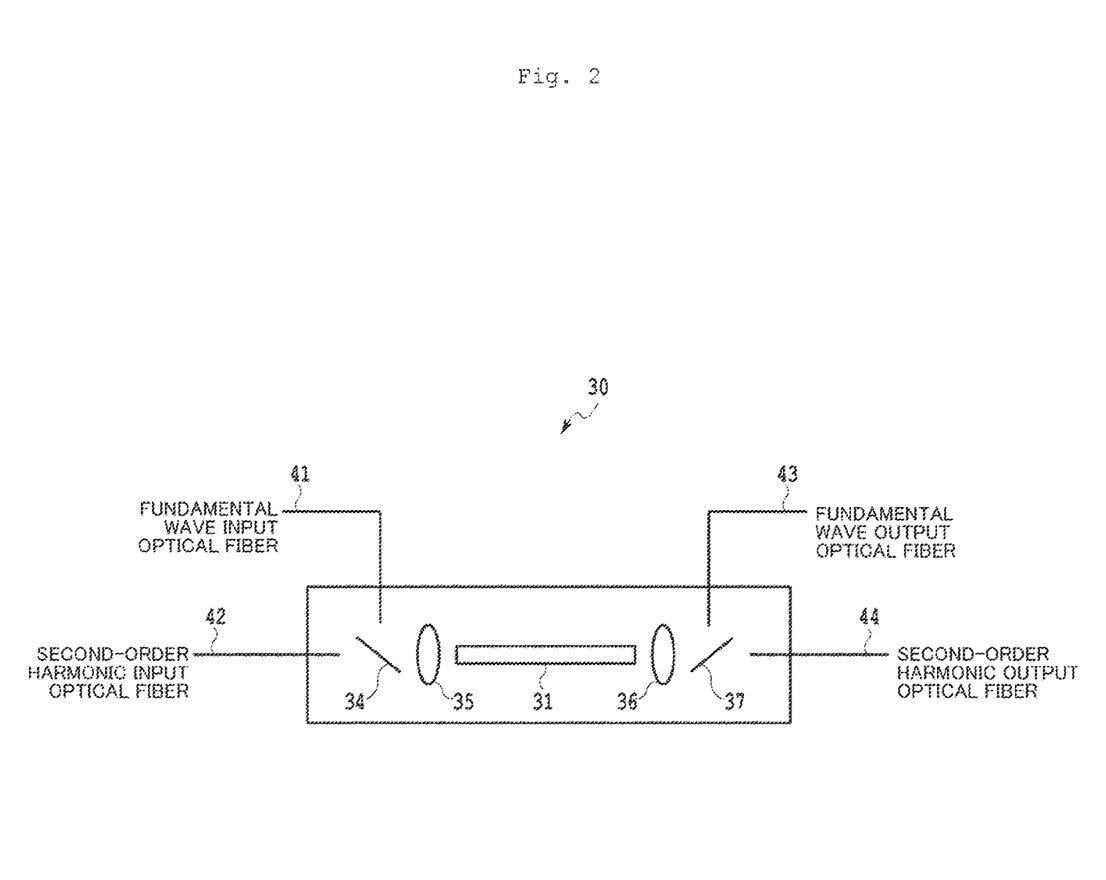
FIG. 2 shows a diagram of a configuration of a wavelength conversion apparatus according to an embodiment of the present invention.

FIG. 2 illustrates a configuration of a wavelength conversion apparatus according to the embodiment of the present invention. The configuration of a wavelength conversion apparatus 20 is schematically shown. The wavelength conversion apparatus 20 includes a wavelength conversion element 31 made of a second-order nonlinear optical medium and having an optical waveguide of a periodically poled structure, an optical system for making light incident on the wavelength conversion element 31, and an optical system for emitting light from the wavelength conversion element 31. In the present embodiment, a polarization maintaining fiber is used as a second-order harmonic input optical fiber 42 and the second-order harmonic output optical fiber 44 for inputting and outputting the second-order harmonic. In addition, light of 1,560 nm wavelength is used as the signal light which is the fundamental wave, and light of 780 nm wavelength is used as the excitation light which is the second-order harmonic. For the second-order harmonic input optical fiber 42 and the second-order harmonic output optical fiber 44, the polarization maintaining fibers that are single-mode guiding for light in the 0.78-μm band are used. The polarization maintaining fiber is mounted where a direction for installing the polarization maintaining fiber is the direction to maximize the wavelength conversion efficiency in a designed nonlinear optical medium.

Generally, in a nonlinear optical medium, only one polarization component contributes to wavelength conversion, and light of the other polarization component does not contribute to wavelength conversion, and the light is passed as it is. Because of this single-polarization operation, if an ordinary single-mode fiber is used as the optical fiber for input/output of the excitation light, which is the second-order harmonic, both polarization components will be propagated. Therefore, the optical power in the optical fiber increases, and the optical density increases at the end face of the optical fiber.

Therefore, in the present embodiment, only the polarized wave necessary for wavelength conversion is used by using the polarization maintaining fiber. The power of the excitation light which is the second-order harmonic is expected to be reduced by 50% at the maximum. As a result, the optical density at the end face of the optical fiber is also reduced, and the damage of the optical fiber is suppressed. Further, energy efficiency can be improved, and unexpected temperature rise of the element due to excessive light can be prevented, and the characteristics of the wavelength conversion apparatus can be improved.

Even if the incident end face of the second-order harmonic output optical fiber 44 is damaged, wavelength conversion is not affected, but since the wavelength conversion element 31 may be damaged by reflected light, it is desirable to use a polarization maintaining fiber for the second-order harmonic output optical fiber 44. Further, it is desirable to use polarization maintaining fibers for a fundamental wave input optical fiber 41 and the fundamental wave output optical fiber 43 for inputting and outputting the fundamental wave in order to improve the conversion efficiency of the non-linear optical medium with respect to the one-side polarization operation as described above.

Further, in order to improve the optical resistance at the end face of the optical fiber, the following method is effective for the optical fiber for inputting and outputting the excitation light which is the second-order harmonic.
  A. Instead of the single mode fiber, a multimode fiber capable of exciting up to a second-order mode is used.
  B. The core diffusion fiber is used in which the core becomes larger as it approaches the end face.
  C. A photonic crystal fiber in which the center of the core is hollow is used.

D. An end cap structure for protecting the fiber end face and spreading light is used.

A. Multimode Fiber

For example, a single mode fiber for 850 nm wavelength becomes a multimode fiber for excitation light of 780 nm. Since the core cross-sectional area of the optical fiber for 850 nm is larger than that of the optical fiber for 780 nm, the optical density of the excitation light at the end face of the optical fiber can be reduced. In general, when the optical device is considered to have the effect of mode interference, it is desirable that the optical component used is a single mode. However, in the nonlinear optical device, only a component having a specific propagation constant contributes to the nonlinear optical effect, so that the effect of multi-mode is small. In addition, since second-order (even-order) modes and first-order (odd-order) modes have different spatial symmetries, the effects of mode coupling and other factors in the optical fiber are small.

B. Core Diffusion Fiber

Figure 3:
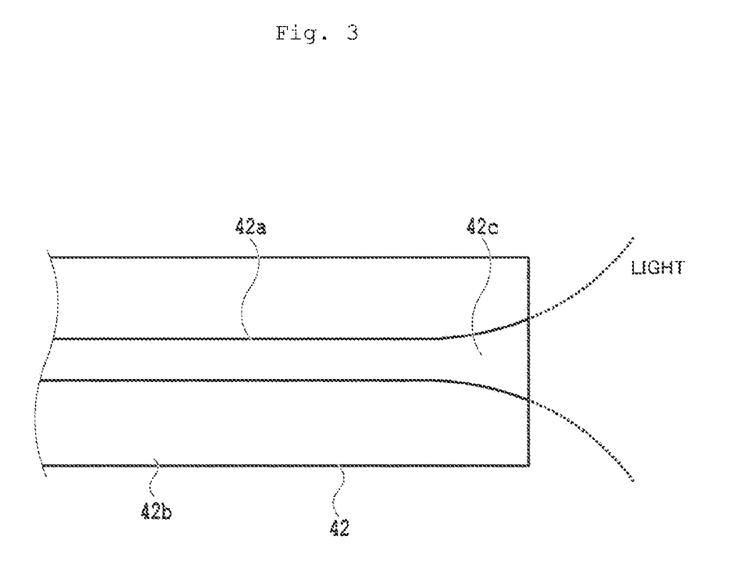
FIG. 3 shows a configuration of a core diffusion fiber according to the present embodiment.

FIG. 3 shows the structure of a core diffusion fiber according to the present embodiment. An example in which a core diffusion fiber (TEC fiber) is applied to the second-order harmonic input optical fiber 42 is shown. The core diffusion fiber has a core diffusion part 42c in which the core 42a increase in core diameter toward the end face of the optical fiber.

In general, it is known that the damage of the optical fiber occurs at the end face of the optical fiber which is in contact with a gas such as air. Therefore, by using the core diffusion fiber, the light density at the end face of the optical fiber can be reduced. The core diffusion fiber may be used in combination with the above-mentioned multi-mode fiber A.

C. Photonic Crystal Fiber

By forming the center part of the core into a hollow and being filled with a gas or a vacuum, the damage of the optical fiber end face, that is, the core end face can be suppressed. In order to make the core central portion hollow, it is necessary to use a photonic crystal fiber. A typical photonic crystal fiber has a plurality of hollows in a cladding in an optical fiber cross section, and the plurality of hollows serve to confine light. The optical resistance of the core end face can be improved, and the propagation constant of the propagating light can be easily controlled. For example, as will be described later in Example 4, when a long-short pulse wave is used for the excitation light, it is possible to control the wavelength dispersion and inject the excitation light into the nonlinear optical medium while maintaining the pulse width.

D. End Cap Structure

Figure 4:
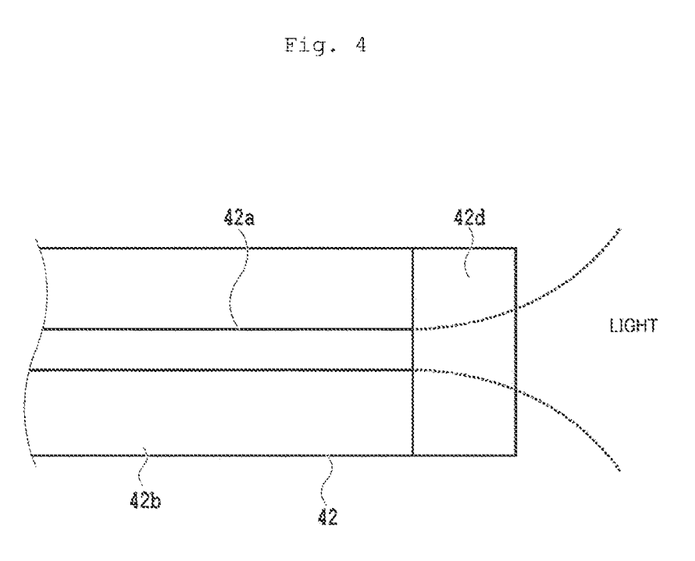
FIG. 4 shows the configuration of an optical fiber having an end cap structure according to the present embodiment.

FIG. 4 shows the structure of an optical fiber having an end cap structure according to the present embodiment. An example in which an end cap structure is applied to the second-order harmonic input optical fiber 42 is shown. The end cap structure is covered with an end cap 42d which is a transparent medium having a uniform refractive index over the entire surface of the end face of the optical fiber. The region of the light emitted from the core 42a is expanded, and the light density at the end face of the optical fiber can be lowered similarly to the core diffusion fiber.

Further, if a material having light resistance to excitation light larger than that of the core material of the optical fiber is used, the damage due to the excitation light can be further suppressed. The end cap structure can be used in combination with any of the above-mentioned techniques A, B, and C, and further improvement in tolerance can be expected.

Example 1

Figure 5:
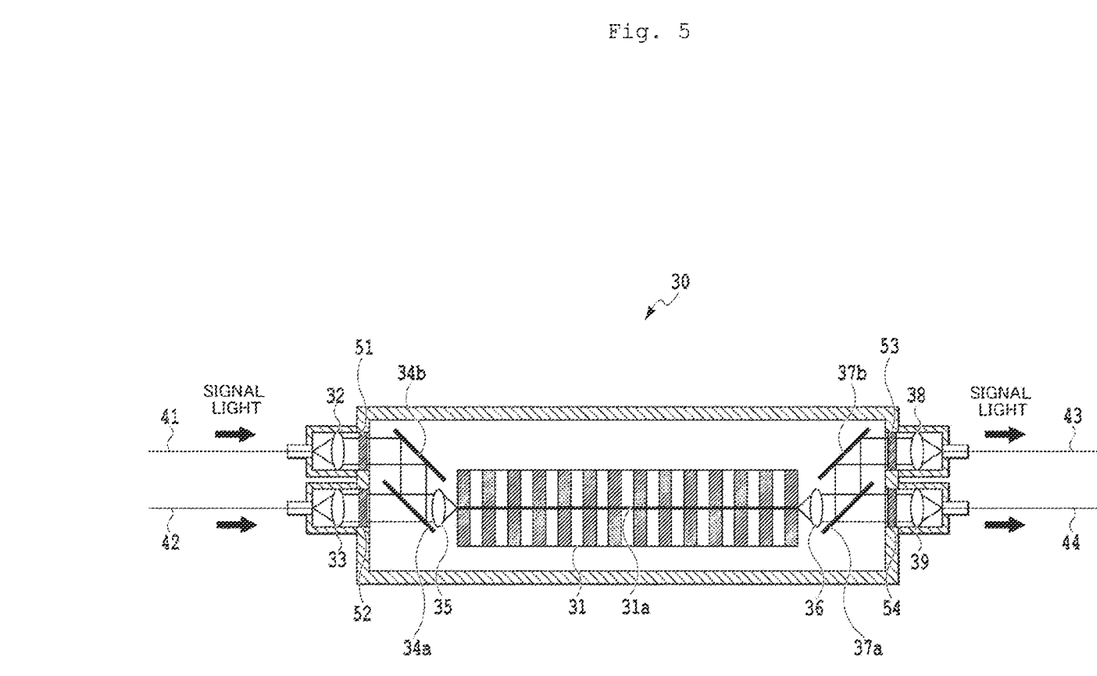
FIG. 5 shows the configuration of the wavelength conversion apparatus in Example 1.

FIG. 5 shows the structure of the wavelength conversion apparatus in Example 1. The wavelength conversion apparatus 30 includes a wavelength conversion element 31 having an optical waveguide 31a of a periodically poled structure, an optical system for making light incident on the wavelength conversion element 31, and an optical system for emitting light from the wavelength conversion element 31. The wavelength conversion element 31 consists of lithium niobate (LN) as a second-order nonlinear optical medium. The 1.56-μm band signal light that is input from the 1.56-μm band optical fiber 41 (fundamental wave input optical fiber) is optically coupled to the optical waveguide 31a of the wavelength conversion element 31 by lenses 32 and 35 through dichroic mirrors 34a and 34b. In addition, the 0.78-μm band excitation light input from 0.78-μm band optical fiber 42 (second-order harmonic input optical fiber) is optically coupled to the optical waveguide 31a by lenses 33 and 35 through dichroic mirror 34a.

The dichroic mirrors 34a and 34b transmit the 0.78-μm band light and reflect the 1.56-μm band light, and the dichroic mirrors 34a combines the 1.56-μm band light and the 0.78-μm band light. To increase the extinction ratio, the dichroic mirrors 34a and 34b were set up to reflect twice against the 1.56-μm band light and to be parallel for the 1.56-μm band light fiber 21 and the 0.78-μm band light fiber 22. And the lenses 35 on the incident side of the wavelength conversion element 31 use common lenses for the 1.56-μm wavelength band and the 0.78-μm wavelength band.

The 1.56-μm band idler light that is output from the output end of the optical waveguide 31a of the wavelength conversion element 31, is optically coupled to a 1.56-μm band optical fiber 43 by lenses 36 and 38 through dichroic mirrors 37a and 37b. After undergoing wavelength conversion operation, the amplified signal light is output from the 1.56-μm band optical fiber 43 (a fundamental output optical fiber) as an idler light. The 0.78-μm band light that is the output from the output end of the optical waveguide 31a, is optically coupled to the 0.78-μm band optical fiber 44 (second-order harmonic output optical fiber) by lenses 36, 39 through the dichroic mirror 17. If the 0.78-μm band can be removed from the output light of the optical waveguide 31a, it is not necessary to connect to a fiber.

At least one lens may be provided immediately before the wavelength conversion waveguide and at least one lens may be provided immediately after the wavelength conversion waveguide. Further, at least one dichroic mirror may be provided on both sides of the wavelength conversion waveguide. When the wavelength extinction ratio is desired to be larger, it is effective to insert a plurality of dichroic mirrors.

The 0.78-μm band optical fibers 42 and 44 for the second-order harmonic are the single-mode polarization maintaining fibers for 780-nm and is mounted in the wavelength conversion apparatus 30 with the polarization oriented to maximize the nonlinear optical effect.

An experiment of wavelength conversion was conducted using the wavelength conversion apparatus thus produced. Even at light intensities of excitation light that would damage the end face of an optical fiber in a conventional wavelength conversion apparatus, the wavelength conversion apparatus according to the present embodiment operated without damage and showed better gain performance than conventional devices. This is due to the fact that the polarization could be maintained, allowing the excitation light to be used efficiently, resulting in sufficient gain even when the excitation light intensity is reduced.

In addition, when the end-cap structure was adopted for the ends of 0.78-μm band optical fibers 42 and 44 for the second-order harmonic, the optical fibers were not destroyed even at higher excitation light intensities than before.

Example 2

The configuration of the wavelength conversion apparatus in Example 2 is the same as in Example 1, but the 0.78-μm band optical fibers 42 and 44 for the second-order harmonic are different. In Example 2, the single-mode polarization maintaining fibers for 850-nm are used as 0.78-μm band optical fibers 42 and 44. This polarization-maintaining fiber is multimode for 780-nm excitation light, and mounted in the wavelength conversion apparatus 30 with the polarization oriented to maximize the nonlinear optical effect.

As compared with the case of using the single-mode polarization maintaining fibers for 780-nm manufactured in Example 1, the optical fiber operated without causing damage to the optical fiber even for excitation light having higher intensity, and the gain characteristic is improved more than before. Furthermore, by using the end cap structure for the end face of the 0.78-μm band optical fiber 42 and 44, the resistance to the light intensity is further improved.

Example 3

The configuration of the wavelength conversion apparatus in Example 3 is the same as in Example 1, but the 0.78-μm band optical fibers 42 and 44 for the second-order harmonic are different. Example 3 uses the core diffusion fiber shown in FIG. 3, which is the single-mode polarization maintaining fibers for 780-nm.

As compared with the case where the ordinary single-mode polarization maintaining fibers manufactured in example 1 was used, the optical fiber operated without causing damage to the optical fiber even for excitation light having higher intensity, and the gain characteristic was improved more than before. Furthermore, by using the end cap structure for the end face of the 0.78-μm band optical fiber 42 and 44, the resistance to the light intensity is further improved.

Example 4

The configuration of the wavelength conversion apparatus for Example 4 is same as in Example 1, but the configuration is different in the point of view using the photonic crystal fibers as 0.78-μm band optical fibers 42 and 44 for the second-order harmonic. As compared with the case of using the single-mode polarization maintaining fibers for 780-nm manufactured in Example 1, the optical fiber operated without causing damage to the optical fiber even for excitation light having higher intensity, and the gain characteristic is improved more than before.

Further, wavelength conversion by short pulse excitation was performed using a photonic crystal fiber in which wavelength dispersion becomes zero near the wavelength of the excitation light. The photonic crystal fiber is relatively easy to control wavelength dispersion. In an ordinary optical fiber, the pulse width of a short pulse after transmission through the optical fiber is widened due to wavelength dispersion. When dispersion control is applied to the photonic crystal fiber, transmission can be performed while maintaining the shape of a short pulse, and incidence can be performed while maintaining the peak of strong light intensity to the nonlinear optical crystal. Therefore, under the condition of short pulse excitation, a higher conversion efficiency can be realized as compared with the wavelength conversion apparatus manufactured in the Examples 1 to 3. This is because the magnitude of the second-order nonlinear optical effect greatly depends on the peak of the light intensity.

The invention claimed is:

1. A wavelength conversion apparatus for performing a wavelength conversion operation by inputting a fundamental wave and a second-order harmonic wave into a second-order nonlinear optical medium, comprising:
   a second-order harmonic input optical fiber optically coupled to a waveguide of the second-order nonlinear optical medium for inputting the second-order harmonic to the waveguide; and
   a second-order harmonic output optical fiber optically coupled to the waveguide for outputting a second-order harmonic output from the waveguide,
   wherein the second-order harmonic input optical fiber and the second-order harmonic output optical fiber are polarization maintaining fibers.

2. The wavelength conversion apparatus according to claim 1, wherein a fundamental wave input optical fiber optically coupled to the waveguide of the second-order nonlinear optical medium for inputting the fundamental wave to the waveguide, and a fundamental wave output optical fiber optically coupled to the waveguide for outputting the fundamental wave output from the waveguide are polarization maintaining fibers.

3. The wavelength conversion apparatus according to claim 1, wherein the second-order harmonic input optical fiber and the second-order harmonic output optical fiber are multimode fibers capable of exciting to a second-order mode with respect to the wavelength of the second-order harmonic.

4. The wavelength conversion apparatus according to claim 1, wherein the second-order harmonic input optical fiber and the second-order harmonic output optical fiber are core diffusion fibers having a core diffusion portion, wherein a core diameter of the core diffusion portion increases toward an optical fiber end surface.

5. The wavelength conversion apparatus according to claim 1, wherein the second-order harmonic input optical fiber and the second-order harmonic output optical fiber are photonic crystal fibers.

6. The wavelength conversion apparatus according to claim 1, wherein the second-order harmonic input optical fiber and the second-order harmonic output optical fiber have end caps being transparent media with uniform refractive indices on end faces of optical fibers.

* * * * *